United States Patent
Hasenour et al.

(10) Patent No.: US 10,390,487 B2
(45) Date of Patent: Aug. 27, 2019

(54) TEXTURED DRAPER BELT FOR AN AGRICULTURAL HARVESTER

(71) Applicant: Deere & Company, Moline, IL (US)

(72) Inventors: Anthony M. Hasenour, Port Byron, IL (US); Daniel S. Hoffman, East Moline, IL (US); Anthony J. Washburn, Orion, IL (US)

(73) Assignee: DEERE & COMPANY, Moline, IL (US)

( * ) Notice: Subject to any disclaimer, the term of this patent is extended or adjusted under 35 U.S.C. 154(b) by 0 days.

(21) Appl. No.: 15/791,357

(22) Filed: Oct. 23, 2017

(65) Prior Publication Data
US 2018/0352742 A1 Dec. 13, 2018

Related U.S. Application Data

(60) Provisional application No. 62/518,557, filed on Jun. 12, 2017.

(51) Int. Cl.
*A01D 61/02* (2006.01)
*B65G 15/34* (2006.01)
(Continued)

(52) U.S. Cl.
CPC ............. *A01D 61/02* (2013.01); *A01D 41/14* (2013.01); *A01D 57/20* (2013.01); *B65G 15/34* (2013.01);
(Continued)

(58) Field of Classification Search
CPC ...... A01D 61/02; A01D 61/002; A01D 34/04; B65G 15/44; B65G 15/34; B65G 2201/042; B65G 15/42
See application file for complete search history.

(56) References Cited

U.S. PATENT DOCUMENTS 5,768,986 A 6/1998 Arnold et al.
6,371,280 B1 * 4/2002 Lindner .................. A01F 15/18
198/690.2
(Continued)

FOREIGN PATENT DOCUMENTS

DE 102015117787 A1 4/2017
EP 2345321 A2 * 7/2011 ............. A01D 57/20
EP 2769612 A1 8/2014

OTHER PUBLICATIONS

Screen capture from Amazon.com posting entitled "1009287 New Draper Belt Made to fit Case-IH Draper Header Models 1052 2052 972+" [retrieved on Jun. 6, 2017]. Retrieved from Internet: <https://www.amazon.com/1009287-Draper-Case-IH-Header-Models/dp/B019A6S97A>.
(Continued)

*Primary Examiner* — Arpad Fabian-Kovacs
(74) *Attorney, Agent, or Firm* — Taft Stettinius & Hollister LLP; Stephen F. Rost

(57) ABSTRACT

A conveyor belt for an agricultural harvesting head includes a base web of elastomer-impregnated fabric; elongate cleats that extend upward from the base web and extend across substantially the entire width of the base web; and a plurality of textured protrusions that extend upward from the web between adjacent elongate cleats, wherein the textured protrusions are organized in rows of pockets between adjacent cleats and extend over substantially the entire width of the base web.

16 Claims, 5 Drawing Sheets

(51) Int. Cl.
*B65G 15/44* (2006.01)
*A01D 41/14* (2006.01)
*A01D 57/20* (2006.01)
*A01D 61/00* (2006.01)
*B65G 15/42* (2006.01)

(52) U.S. Cl.
CPC ............ *B65G 15/44* (2013.01); *A01D 61/002* (2013.01); *B65G 15/42* (2013.01); *B65G 2201/042* (2013.01)

(56) References Cited

U.S. PATENT DOCUMENTS

| | | | | |
|---|---|---|---|---|
| 8,402,728 | B2* | 3/2013 | Kidd | B65G 15/30 198/844.1 |
| 9,622,412 | B2* | 4/2017 | Hasenour | A01D 57/20 |
| 9,635,810 | B2* | 5/2017 | Leys | A01D 41/14 |
| 2002/0175055 | A1* | 11/2002 | Ryde | B65G 15/34 198/847 |
| 2006/0081516 | A1* | 4/2006 | Hendrickson | B07B 1/10 209/707 |
| 2007/0175737 | A1* | 8/2007 | Honeycutt | B65G 15/08 198/822 |
| 2008/0276591 | A1* | 11/2008 | Tippery | A01D 57/06 56/181 |
| 2011/0094201 | A1* | 4/2011 | Bomleny | A01D 61/02 56/181 |
| 2014/0165526 | A1* | 6/2014 | Leys | A01D 41/14 56/181 |
| 2016/0031650 | A1* | 2/2016 | Petersen | B65G 15/42 198/699.1 |
| 2017/0190511 | A1* | 7/2017 | Takahashi | B65G 15/42 |

OTHER PUBLICATIONS

Search Report issued in counterpart application No. EP18176559.5, dated Nov. 15, 2018 (8 pages).

* cited by examiner

TEXTURED DRAPER BELT FOR AN AGRICULTURAL HARVESTER

FIELD OF THE INVENTION

This invention relates to agricultural harvesters. More particularly it relates to agricultural harvesting heads. Even more particularly, it relates to endless belt conveyors for agricultural harvesting heads.

BACKGROUND OF THE INVENTION

Agricultural harvesters such as combines or windrowers, travel through fields of agricultural crop harvesting the crop. In one common arrangement, agricultural harvesting heads extend forward from the agricultural harvester to engage the plant stalks, sever them, and carry the severed crop into the body of the agricultural harvester itself for further processing. To do this, the agricultural harvesting head has a reciprocating knife supported on the frame of the harvesting head. This reciprocating knife extends laterally, perpendicular to the direction of travel of the agricultural harvester. It extends substantially the entire width of the agricultural harvesting head. The reciprocating knife severs the crop across the width of the agricultural harvesting head and permits it to fall rearward into a laterally extending conveyor. This conveyor conveys cut crop from opposing lateral ends of the agricultural harvesting head to a central region of the head. In the central region, the conveyor changes the direction of crop flow and conveys it rearward into a feeder house of the agricultural harvester.

The cut crop conveyors on the head are typically made in three sections, left section that conveys the cut crop inwardly from the left side of the harvesting head to the central region, a right section that conveys the crop inwardly from the right side of the harvesting head to the central region, and a center conveyor that receives the crop from the left section in the right section and conveys it rearward into the feeder house of the agricultural harvester.

The left and right sections are typically formed as endless flexible belts supported at their inner end and their outer end on elongate rollers mounted to the frame of the agricultural harvesting head. These belts have a forward edge that is tilted downward toward the ground immediately adjacent to the reciprocating knife in order to catch all of the cut crop material as it falls onto the harvesting head immediately behind the reciprocating knife. These belts have a rear edge that is elevated above the front edge. As a result, the upper surface of the belt is tilted. The tilt of the belt permits grain in the cut crop material to roll down the belt until it reaches the forward edge of the belt adjacent to the reciprocating knife. If the grain reaches the forward edge of the belt, it eventually falls through gaps between the belt and the frame of the harvesting head, falls onto the ground and is lost.

What is needed is an endless belt for an agricultural harvesting head that reduces the ability of the grain to roll down the surface of the endless belt. It is an object of this invention to provide such a belt.

SUMMARY OF THE INVENTION

In accordance with a first aspect of the invention a conveyor belt for an agricultural harvesting head comprises: a base web of elastomer-impregnated fabric; elongate cleats that extend upward from the base web and extend across substantially the entire width of the base web; and a plurality of textured protrusions that extend upward from the web between adjacent elongate cleats, wherein the textured protrusions are organized in rows of pockets between adjacent cleats and extend over substantially the entire width of the base web.

The rows of pockets may extend in a direction parallel to a direction of travel of the belt and perpendicular to a longitudinal extent of the cleats.

The pockets may be curved in plan view.

A gap may be between adjacent pockets through which grain can leak.

The pockets may be semicircles.

No gap may be provided between adjacent pockets in a row, and each pocket may abut its adjacent pocket.

Each row of adjacent pockets may form a zigzag pattern and that pattern extends in a direction of movement of the conveyor belt.

Each pocket of a first row of pockets may have a convex side facing an uphill edge of the conveyor belt, and a second row of pockets adjacent to the first row may have a concave side facing the uphill edge of the conveyor belt.

The rows of pockets may protrude upward from the base web a distance sufficient to catch and hold grain rolling downhill in a direction perpendicular to the direction of travel of the conveyor belt.

Each row of the rows of pockets may extend between two adjacent cleats and terminate at the two adjacent cleats.

The semicircles may have the same diameter and may be spaced the same distance apart.

Each row of pockets in the zigzag pattern may extend between and terminates at two adjacent cleats.

Each row of pockets in the zigzag pattern may extend perpendicular to a longitudinal extent of the cleats and may extend from one cleat to an adjacent cleat.

Each of the zigzag pockets may define an obtuse angle of between 90 and 150° at each zigzag. The obtuse angle may be between 100 and 130° at each zigzag. The obtuse angle may be between 105 and 125° at each zigzag.

DETAILED DESCRIPTION OF THE PREFERRED EMBODIMENTS

Figure 1:
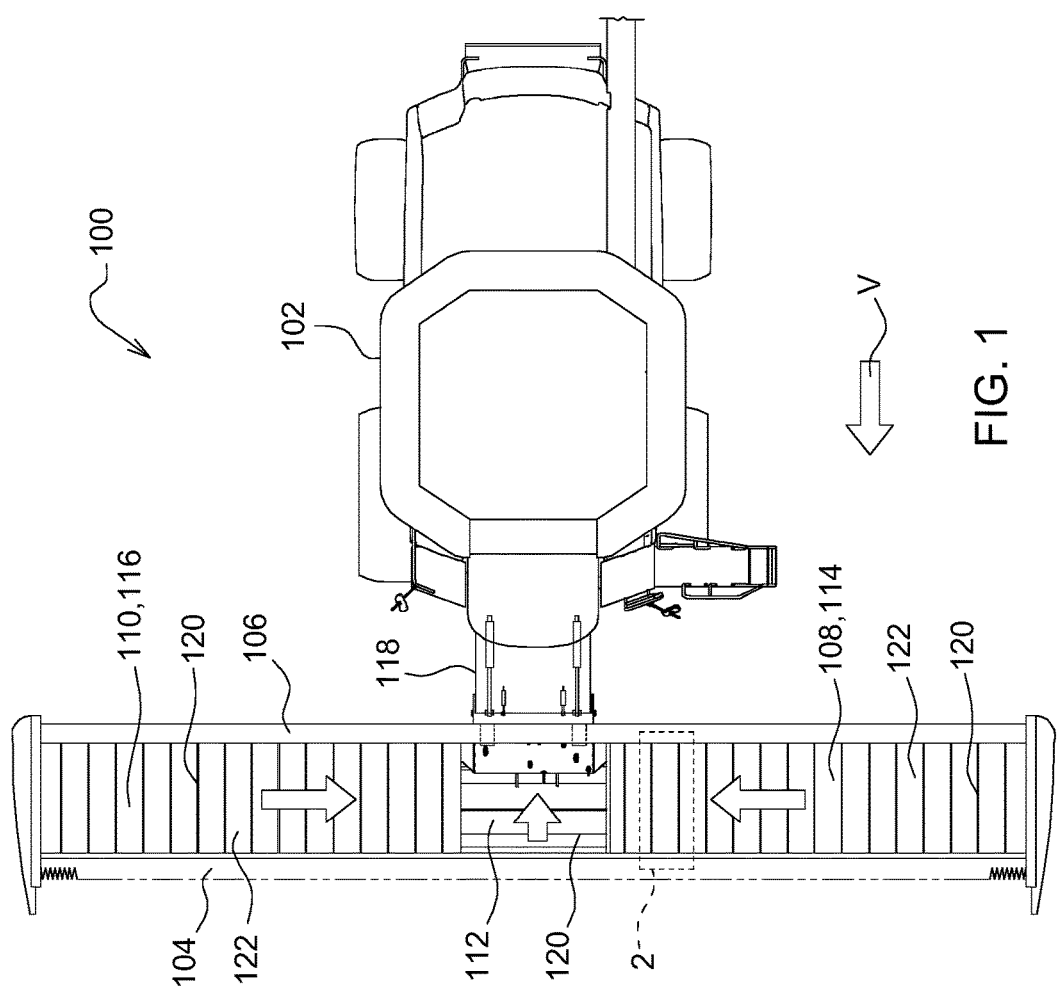
FIG. 1 illustrates a plan view of an agricultural harvester in accordance with the present invention.

In FIG. 1, an agricultural harvester 100 includes a self-propelled harvesting vehicle 102 to which an agricultural harvesting head 104 is affixed on the front end of the agricultural harvesting vehicle. The agricultural harvesting head includes a frame 106 that extends laterally, perpendicular to the direction of travel "V" of the agricultural harvesting head. The frame 106 supports a left side conveyor 108, right side conveyor 110, and a center conveyor 112. The left side conveyor comprises a first endless belt 114 that extends from an outer end of the left side of the agricultural harvesting head to a point adjacent to the center of the agricultural harvesting head. In a similar and mirror fashion, the right side conveyor comprises a second endless belt 116 that extends from an outer end of the right side of the agricultural harvesting head 104 to a point adjacent to the lateral midpoint of the agricultural harvesting head 104.

Each of these two conveyor belts 114, 116 is supported on rollers (not shown) at the opposite ends of the belt. Each of the two conveyor belts 114, 116 recirculate about its corresponding rollers. The direction of movement of the upper conveying surface of each endless belt is indicated by and arrow symbol superimposed on the belts in FIG. 1.

The center conveyor likewise has an endless belt supported on rollers at opposite ends of the belt and about which the belt recirculates. The center endless belt, however, moves in a direction parallel to the direction of travel "V" of the agricultural harvesting head. The upper surface of the endless belt moves rearwardly to carry cut crop material received from the left conveyor and the right conveyor and to carry it rearwardly into a feederhouse 118 and thence into the agricultural harvester itself.

All three of the endless belts have a base layer comprising a thin web of elastomer-impregnated fabric having constant thickness. This base layer is approximately 1-1.5 meters in width. The base layer of the side conveyors is approximately 8-15 meters in length. The ends of these base layers are spliced or cured together at their opposing ends to form a continuous loop.

To the outer surface of this base layer, several elongate cleats 120 (also called ridges or ribs) are fixed. The cleats 120 are straight, evenly spaced apart and extend perpendicular to the direction of travel of the belts. These cleats 120 extend upward from the surface of the flat base web 122 of the endless belt. The spacing of adjacent cleats 120 is approximately 5 cm. The cleats 120 function to engage the cut crop mat that falls upon the upper surface of the endless belts, and to help move the left and right crop mats inwardly to the middle of the agricultural harvesting head frame and then rearwardly into the feederhouse.

Figure 2:
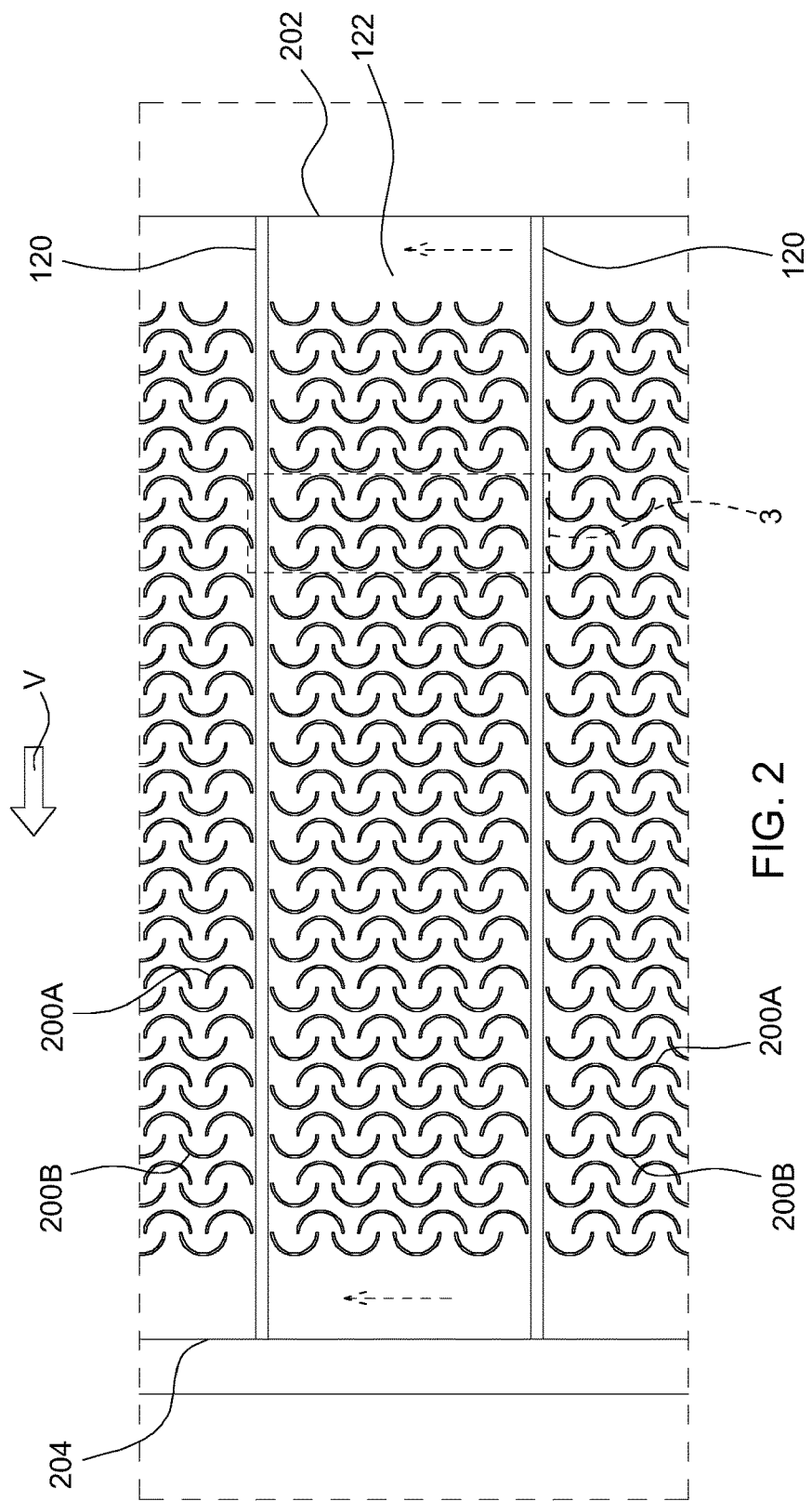
FIG. 2 illustrates a plan view of a repeating pattern of an endless belt of the agricultural harvester of FIG. 1. This repeating pattern is shown in FIG. 1 as item 2.
Figure 3:
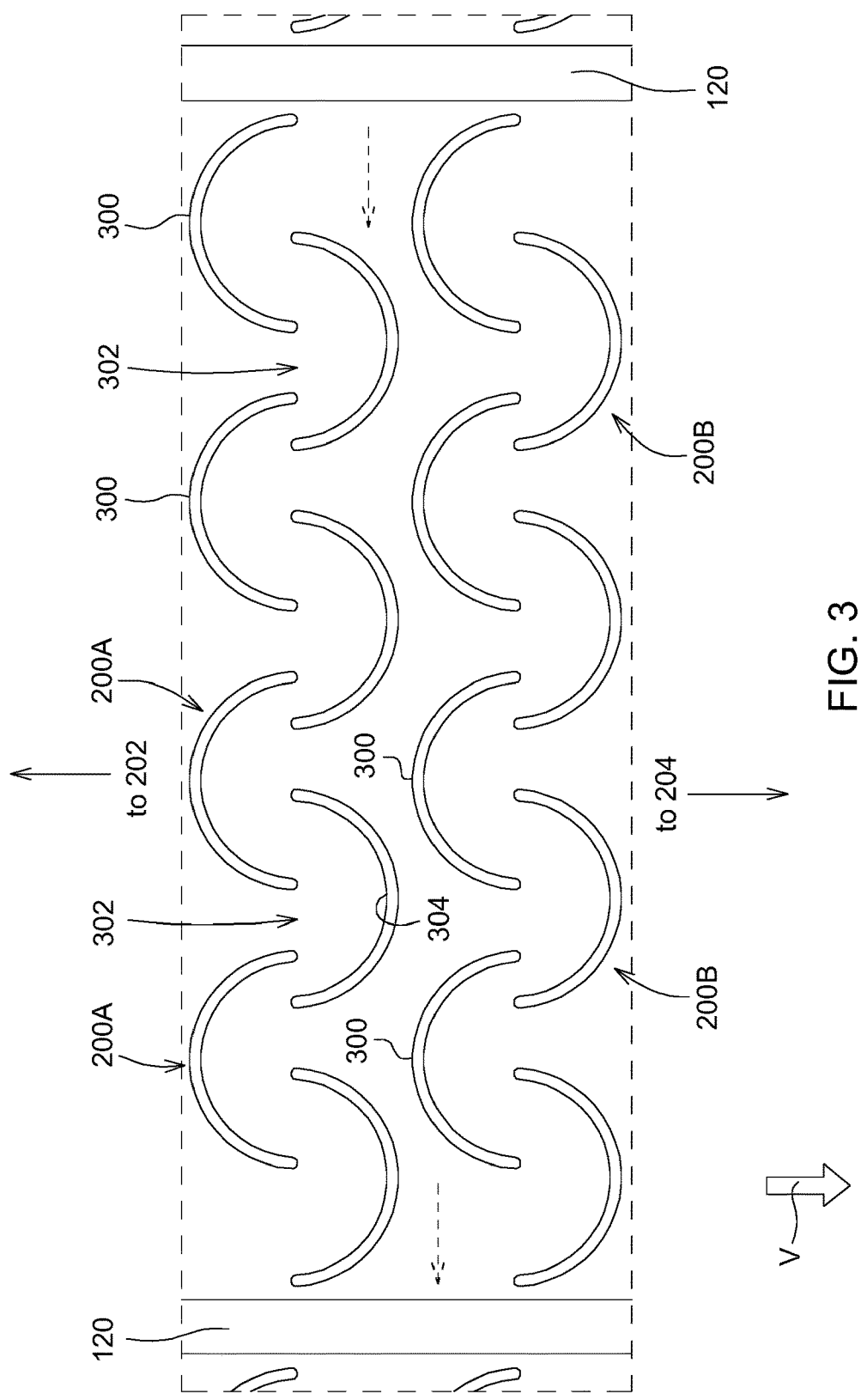
FIG. 3 illustrates a fragmentary plan view of repeating details of the belt pattern of the endless belt of FIGS. 1-2. This fragmentary plan view is shown in FIG. 2 as item 3.

FIGS. 2 and 3 illustrate a repeating section of the left side conveyor belt (the right side endless belt is constructed identically). In FIG. 2, two adjacent cleats 120 bracket a repeating pattern of protrusions that extend from the upper surface of the endless belts and that comprising adjacent semicircles 200. The semicircles 200 include a first group of semicircles 200A that open toward the rear edge 202 of the endless belt, and a second group of semicircles 200B that open toward the front edge 204 of the endless belt. The semicircular protrusions function as small pockets that receive grain rolling down the upper surface of the belt under the force of gravity. Further, since the pockets are concave facing uphill, grain is restricted from moving out of the pocket in three directions: the downhill direction (from the rear edge 202 and toward the front edge 204) as well as the two side-to-side directions perpendicular to the downhill direction.

The rear edge 202 of the endless belt is disposed above the front edge 204 for the endless belt, and thus grain falling out of the cut crop mat traveling on top of the belt will fall on to the web 122 of the belt between the cleats, and will tend to roll downhill (from edge 202 to edge 204).

In FIG. 3, as grain falls onto the web 122 and rolls downward under the force of gravity, it will contact the convex side 300 of the semicircles 200A, roll around and along the convex side 300 to the ends of the semicircles 200A, and fall into a gap 302 between adjacent semicircles 200A. The grain falling into the gap 302 will be deposited into a concave side of semicircles 200B, which will receive the grain and carry the grain, as in a curved bucket. Grain is carried this way to the end of the endless belt, where it loops around a roller and drops the grain onto the endless belt of the center conveyor 112.

Figure 4:
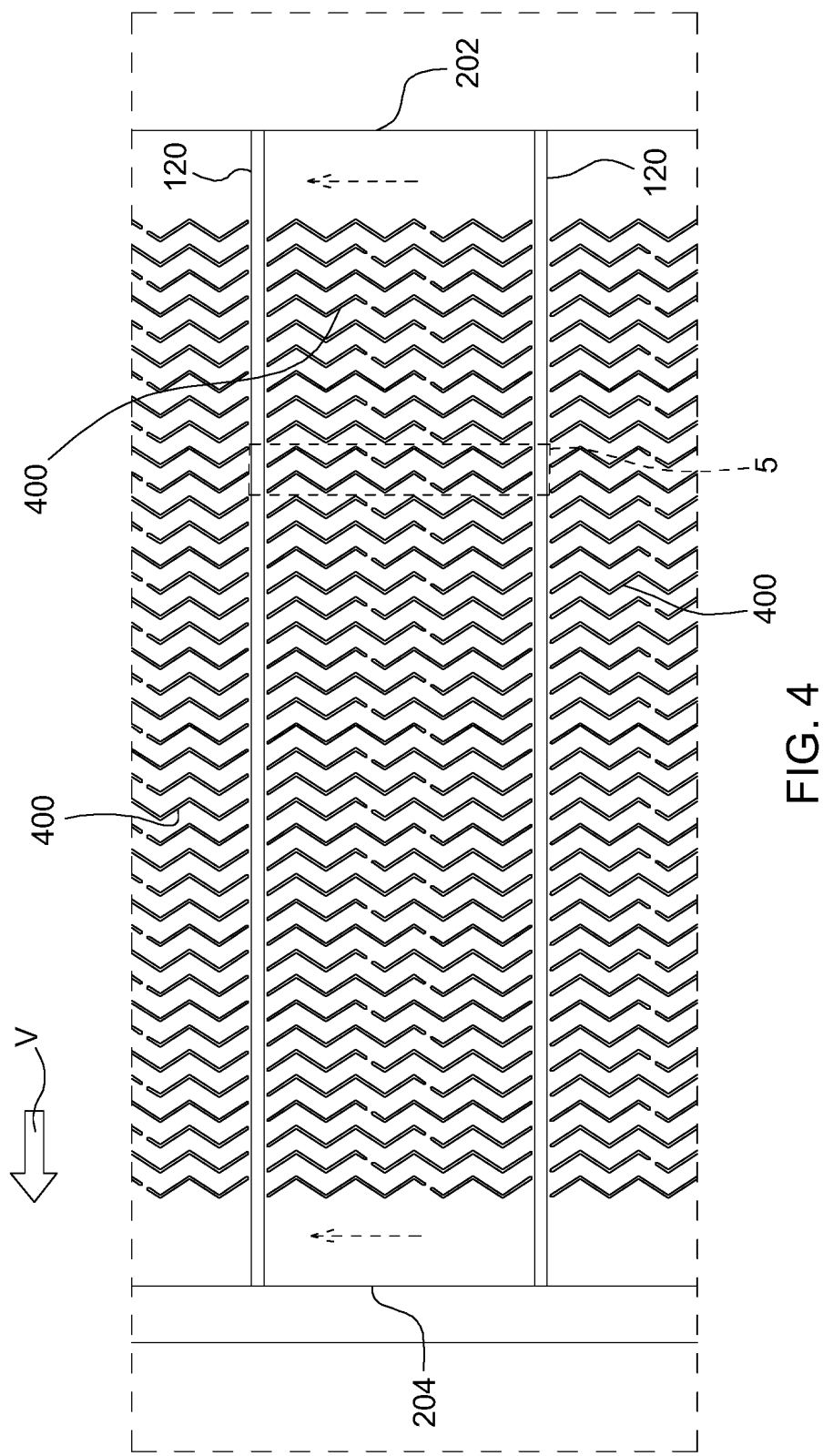
FIG. 4 illustrates a plan view of an alternative repeating pattern of an endless belt of the agricultural harvester of FIG. 1. This repeating pattern is shown in FIG. 1 as item 2.
Figure 5:
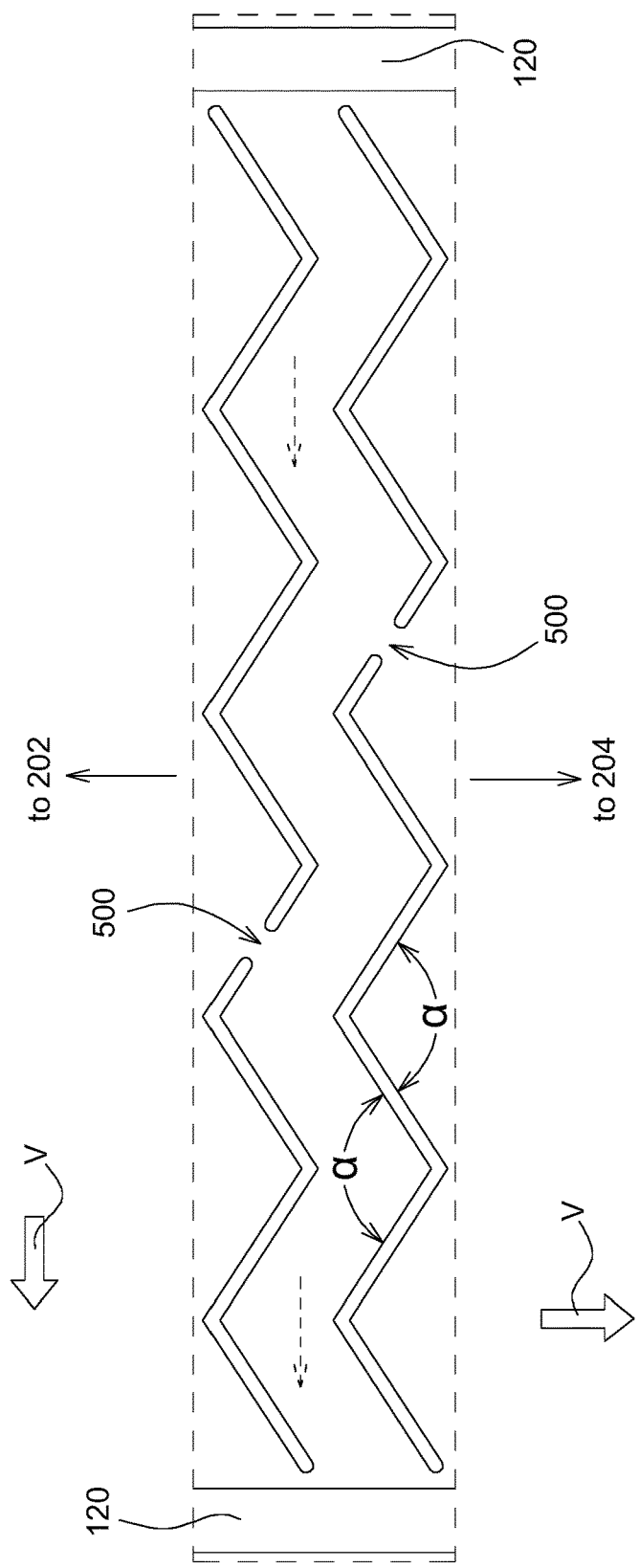
FIG. 5 illustrates a fragmentary plan view of repeating details of the alternative repeating pattern of the endless belt of FIGS. 1, 4. This fragmentary plan view is shown in FIG. 4 as item 5.

FIGS. 4 and 5 illustrate an alternative repeating section of the left side conveyor belt (the right side conveyor belt is constructed identically). In FIG. 4, two adjacent cleats 120 bracket an alternative repeating pattern of elongate zigzag protrusions 400 that extend upward from the upper surface of the endless belts. These protrusions 400 extend from one cleat 120 to an adjacent cleat 120. They cover substantially the entire upper (crop-carrying) surface of the endless belt in a direction "V" parallel to the direction of travel of the belt as a recirculates about the rollers that supported on opposing ends. The protrusions 400 are not straight, but are zigzag, comprising nine short straight lengths that abut each other at their ends to form an obtuse angle alpha of between 90° and 150°, more preferably 100° to 130°, and more preferably 105° to 125°.

As in the case of the concave semicircular pockets of FIGS. 2-3, each pair of adjacent short straight lengths also form pockets that resist movement of grain in that pocket in three directions: downhill, and side-to-side. A series of zigzag protrusions form a row of abutting V-shaped pockets that extend from one cleat 120 to an adjacent cleat 120.

Periodic breaks 500 may be provided in each of the zigzag protrusions to permit the endless belt to flex more easily as it passes around the rollers that support the ends of the endless belt.

The endless belts may be formed out of a continuous web of material with molded-on protrusions and cleats extending from the surface or the protrusions and cleats may be fixed to the web of material. Further, the ends of the belt may be held together by a mechanical splice to create the endless loop of the belt, or the belt may be formed without a mechanical splice such as by abutting or overlapping the ends of the web together and curing the ends together such as by a vulcanization process.

The invention is defined by the claims below. The discussion above and the figures are provided merely to illustrate at least one working example of the invention. Based upon the description above, a person skilled in the art could readily figure out other ways of practicing the invention as defined in the claims.

The invention claimed is:

1. A conveyor belt configured tope extend along a conveyor of an agricultural harvesting head, the conveyor belt comprising:
   a base web of elastomer-impregnated fabric having a first edge and a second edge;
   elongate cleats that extend upward from the base web and extend across substantially the entire width of the base web, wherein each of the elongate cleats extend perpendicularly to the first edge and the second edge; and
   a plurality of protrusions that extend upward from the web between adjacent elongate cleats, wherein each of the protrusions includes a terminating end and defines a pocket, and wherein the protrusions are organized in adjacent rows aligned between adjacent cleats and the terminating end of each of the plurality of protrusions of one row is directed toward one of the pockets of an adjacent row of protrusions.

2. The conveyor belt of claim 1, wherein the rows of protrusions extend in a direction parallel to a direction of travel of the belt and perpendicular to a longitudinal extent of the cleats.

3. The conveyor belt of claim 1, wherein each of the plurality of protrusions are is curved in plan view.

4. The conveyor belt of claim 3, wherein a gap is provided between adjacent protrusions of a row of protrusions through which grain can leak.

5. The conveyor belt of claim 3, wherein the protrusions are semicircles.

6. The conveyor belt of claim 1 wherein no gap is provided between adjacent pockets in a row, and wherein each protrusion abuts its adjacent protrusion.

7. The conveyor belt of claim 1, wherein each row of adjacent pockets protrusions forms a zigzag pattern and wherein that pattern extends in a direction of movement of the conveyor belt and perpendicular to al longitudinal extent of the cleats.

8. The conveyor belt of claim 5, wherein each protrusion of a first row of protrusions has a convex side facing, an uphill edge of the conveyor belt, and wherein a second row of protrusions adjacent to the first row has a concave side facing the uphill edge of the conveyor belt.

9. The conveyor belt of claim 2, wherein the rows of pockets protrusions protrude upward from the base web a distance sufficient to catch and hold grain rolling downhill in a direction perpendicular to the direction of travel of the conveyor belt.

10. The conveyor belt of claim 2, wherein each row of the rows of protrusions extends between two adjacent cleats and terminates at the two adjacent cleats.

11. The conveyor belt of claim 5, wherein the semicircles have the same diameter and are spaced the same distance apart.

12. The conveyor belt of claim 7, wherein each row of protrusions in the zigzag pattern extends between and terminates at two adjacent cleats.

13. The conveyor belt of claim 12, wherein each row of protrusions in the zigzag pattern extends perpendicular to a longitudinal extent of the cleats and extends from one cleat to an adjacent cleat.

14. The conveyor belt of claim 13, wherein each of the zigzag protrusions defines an obtuse angle of between 90 and 150° at each zigzag.

15. The conveyor belt of claim 14, wherein the obtuse angle is between 100 and 130° at each zigzag.

16. The conveyor belt of claim 14, wherein the obtuse angle is between 0.105 and 1.2° at each zigzag.

* * * * *